(12) United States Patent
Assie

(10) Patent No.: US 6,397,463 B1
(45) Date of Patent: Jun. 4, 2002

(54) METHOD FOR MACHINING A CRANKSHAFT

(75) Inventor: Jean-Paul Assie, Castres (FR)

(73) Assignee: Renault Automation Comau, Meudon la Foret (FR)

( * ) Notice: Subject to any disclaimer, the term of this patent is extended or adjusted under 35 U.S.C. 154(b) by 0 days.

(21) Appl. No.: 09/380,619

(22) PCT Filed: Mar. 18, 1998

(86) PCT No.: PCT/FR98/00547

§ 371 (c)(1),
(2), (4) Date: Nov. 16, 1999

(87) PCT Pub. No.: WO98/41348

PCT Pub. Date: Sep. 24, 1998

(30) Foreign Application Priority Data

Mar. 19, 1997 (FR) ............................................. 97 03513

(51) Int. Cl.[7] ................................................ B21K 1/08
(52) U.S. Cl. ........................ 29/888.06; 29/6.01; 29/406
(58) Field of Search ............................... 29/888.08, 406, 29/407.01, 407.04, 407.05, 407.08, 407.09, 6.01, 557

(56) References Cited

U.S. PATENT DOCUMENTS

| | | | |
|---|---|---|---|
| 4,559,681 A | * 12/1985 | Coquillart et al. | |
| 4,774,746 A | * 10/1988 | Blaimschein | |
| 4,884,210 A | * 11/1989 | Blaimschein | |
| 5,025,689 A | * 6/1991 | Mayer | |
| 5,131,143 A | * 7/1992 | Kirchberger | 29/888.08 |
| 5,408,745 A | * 4/1995 | Tomiyama et al. | 29/888.08 |
| 5,429,422 A | * 7/1995 | Baldi | |

FOREIGN PATENT DOCUMENTS

| | | | |
|---|---|---|---|
| EP | 0 334 298 | 9/1989 | |
| JP | 58-090344 | * 5/1983 | 29/6.01 |
| JP | 1-257502 | * 10/1989 | |
| WO | WO 96/17705 | 6/1996 | |

* cited by examiner

Primary Examiner—S. Thomas Hughes
Assistant Examiner—Eric Compton
(74) Attorney, Agent, or Firm—Oblon, Spivak, McClelland, Maier & Neustadt, P.C.

(57) ABSTRACT

A method for machine a V crankshaft. A measurement is made of the dynamic mass and the centering points are drilled. The reference surfaces are preset by machining the raw crankshaft reference surfaces before the dynamic mass measurement.

10 Claims, 2 Drawing Sheets

METHOD FOR MACHINING A CRANKSHAFT

BACKGROUND OF THE INVENTION

1. Field of the Invention

The present invention relates to the field of machining crankshafts and more particularly to modifications ensuring the localization of machining centerings (part axis) under the best conditions.

2. Discussion of the Background

Crankshafts are mechanical parts presented in the shape of shafts which ensure the transformation of an alternative rectilinear movement of the set piston-connecting rod of a thermal motor in circular movement. These parts are classically executed by forging or casting before being machined precisely to integrate inside a thermal motor crankcase.

In the example of a thermal motor with four cylinders, the crankshaft comprises five bearings by the means of which it is in pivoting link with the crankcase, four crankpins arranged parallel with the rotation axis of the crankshaft and being used to drive the four connecting rods and four counterweights ensuring a balance of the crankshaft mass in relation to its rotation axis with the four crankpins and the eight arms which shift them from the rotation axis of the crankshaft.

As machining is expensive, it is therefore essential to limit duration and frequence and thus to keep a maximum of raw surfaces on the crankshafts while still respecting the geometrical and dynamic constraints voiced by the motor vehicle manufacturers.

The geometrical constraints are machining precision constraints which must be as precise as possible so as to optimise the pivoting links of the crankshaft with the crankcase or the connecting rods. The crankshaft being in origin a forged or cast part, the reference surfaces, that is to say centering points, must be as precise as possible to assume an optimum repetition of precision of position, that is to say an identical position of the crankshaft from one machining station to another.

The dynamic constraints, on their part, concern the balancing of the crankshaft which, during its rotation, must not create a moment of inertia outside the rotation axis of the crankshaft. The mass (mass of the crankpins, mass of the counterweights) and above all the surfaces staying raw after machining must be sufficiently balanced so that during the rotation of the crankshaft, the unbalance remaining is minimised. The unbalance remaining, that is to say a fault in the balancing of the crankshafts can, if it is too great, bring on early wear of the components in contact with it and cannot ensure a good transmission of movement, thus bringing about losses in output as well as excessive fuel consumption. Also, remaining unbalance generates a vibratory effect which, if it is too great can cause of lack of comfort in the driving of the vehicle.

The existing methods for machining a crankshaft offer then to ensure at the start of their machining line, a reference centre depending on a dynamic mass measurement effective from the raw crankshaft.

Classically, after the dynamic mass measurement the centering points defining the reference axis are machined so that the unbalance zone and thus the principal inertia axis are situated in the counterweights zone, so that during the passage of the "balancing device" at the end of the machining line, the machined crankshaft can be balanced by removing a minimum of matter in drilling the counterweights. It is obvious that during the passage of the crankshaft on the balancing device at the end of the machining line, this balancing device measures its unbalance by driving it in rotation with cylindrical surfaces coaxial with the rotation axis of the crankshaft itself. As mentioned in the prior art description of the European patent N°0 334 298, these cylindrical surfaces have been previously machined during the earlier machining stages using the centering points which were defined by machining after dynamic mass measurement.

Nevertheless, the raw surfaces of the crankshaft prevent a precise enough dynamic mass measurement to answer to the ever greater quality of the machining criteria required by motor vehicle manufacturers. It is particularly difficult to ensure a good repetition of position by making the ends of a crankshaft hold by the jaw of a chuck to drive it in rotation so as to measure dynamically the mass then in placing those ends on numerised supports so as to direct the crankshaft to means of centering points drilling as the jaws are tight on a raw surface, and thus imprecise. Similarly, even though the principle of numerised supports is the technical solution most adapted to the positioning of a part, the capacities of this positioning are not fully exploited as the surfaces with which the said supports are in contact are not regular. Not only do the numerised supports take into account an imprecise dynamic measurement because it has been executed on irregular surfaces, but also the numerical supports direct the crankshaft in resting also on raw surfaces, which has for consequence a bad materialisation of the inertia axis by centering points drilling.

Furthermore, this lack of precision in locating the principal inertia axis and therefore the reference axis increases the remaining unbalance as the crankshaft progresses little by little in the machining line resulting from the lack of precision in the repetition of precision of position so that during the passage in "balancing device" the removal of matter on the counterweights at the end of the production line of the crankshafts becomes a long and expensive process.

So, even though the passage of the raw crankshaft in a device of dynamic measurement enables to better evaluate the unbalancing zone and ensures a better geometrical centering, this method on its own is impaired by its relative imprecision.

SUMMARY OF THE INVENTION

On the basis of these findings, the applicant has questionned the machining line of classical crankshafts and conducted research to lead to finding a method for producing crankshafts which ensures better locating of the unbalance so as to determine, with the maximum of precision, the reference axis of the crankshaft and thus ensuring an optimum repetition of precision of position. This research has led to a particularly original and judicious method of production reaching a precision never before reached in this field without incurring prohibitive additional cost in the production of crankshafts.

According to the principal characteristic of the invention, the method for machining a crankshaft of the type comprising the operations for dynamic mass measurement and of centering points drilling at the start of the machining line, is remarkable in that it consists in pre-setting by machining of the raw crankshaft the reference surfaces before the operation of mass dynamic measurement. This characteristic is particularly advantageous as until now, and as described in the prior art, the dynamic unbalance measurement has been taken from the raw surfaces of the crankshafts. It will therefore be easier to materialise the inertia axis from the machined reference surfaces and not the raw ones. The definition by machining of a fictitious geometrical axis even if it is erroneous enables to take a fixed reference during dynamic mass measurement and thus ensures an optimum configuration of the numerised supports during centering points drilling. Also, the pre-setting of reference surfaces guarantees a good repetition of precision of position between the dynamic mass measurement station and the centering points drilling one materialising the reference axis, this repetition of precision of position was not ensured in the prior art methods as the driving of the crankshafts was done directly on a raw part.

The reconsideration of the machining line by the applicant, realized by this first claim, constitutes a break from the usual reasoning of the professionals as it advocates machining before execution of the reference surfaces and thus with the support and gripping points on the raw surface of the crankshaft. This new technique detaches itself from the ones proposed in the prior art in which the reference surfaces were machined on the crankshaft before it was balanced but at an advanced stage of its final formatting into shape, that is to say that the machine machining such reference surfaces before balancing could use surfaces already machined as support and gripping points. In view of the lack of precision of the first balancing (as executed on a raw surface), the realisation of reference surfaces for final balancing taking support on surfaces machined from a badly situated geometrical axis, also lacks precision and this leads to a long and expensive operation of balancing (when this is possible).

According to a particularly advantageous characteristic of the invention, the method for machining crankshafts is remarkable in that it consists in pre-setting the said reference surfaces by machining both ends of the crankshaft before the operation of dynamic mass measurement. The choice of place of reference is particularly judicious by the fact that the ends of the crankshafts are surfaces which are easy to machine compared with the other bearings which find themselves inserted between the arms or between the counterweights.

According to another particularly advantageous characteristic of the invention, the method consists in pre-setting the reference surfaces by trimming the cylindrical and plane surfaces of both ends of the crankshaft. The use of the trimming operation is particularly advantageous by the fact that it takes away the need to turn the crankshaft which, as a raw part, would thus give a bad engagement and a bad balancing in the case of an engagement by one of its ends in a chuck for example. Also, the trimming operation enables to take support points on the crankshaft and thus to integrate in the whole of the indications of dimensions constituting the machining assembly of this trimming operation, the indications of dimensions of the raw crankshaft so as to respect the criteria of space needed and the movement of the crankshaft in the crankcase or of passage with the piston, such as fixed by the car manufacturer.

According to another particularly advantageous characteristic of the invention, the method consists of placing the crankshaft in a dynamic measurement device, after the machining operation of the reference surfaces and ensuring the rotation of the crankshaft by driving by adherence on the aforesaid machined cylindrical surfaces. It is indeed possible thanks to the pre-setting by machining of the reference surfaces to use such a means of setting into motion to make the crankshaft rotate on the fictitious geometrical axis materialised by the pre-machined surfaces.

According to another particularly advantageous characteristic of the invention, during dynamic mass measurement the diameter of the cylindrical reference surfaces having just been machined on the crankshaft, is measured so that the said diameter enters in the positioning parameters of the numerised supports used to position the crankshaft during the centering points drilling operation. This additional parameter, other than the fact that it brings a better precision in the definition of the reference axis used to position the crankshaft on a large part of the machining line, enables also to take into consideration the wear of the tools used for the machining operation of the reference surfaces before balancing.

In conceiving this new method, the applicant aims by an action of that same method in suitability with the improvement of the precision and of the state of the surface of the crankshafts coming out of forging or of casting coupled with an evolution of the criteria of the remaining unbalance of the crankshaft at the end of machining, to do away with the final balancing station classically present at the end of the crankshaft machining line.

The fundamental concepts of the invention having just been detailed hereinabove in their most elementary form, more details and characteristics will come out more clearly when reading the description hereinafter using as a non limitative example and having regard to the attached drawings, an illustration of a method for machining crankshafts in accordance with the invention.

DETAILED DESCRIPTION OF THE PREFERRED EMBODIMENTS

Figure 1:
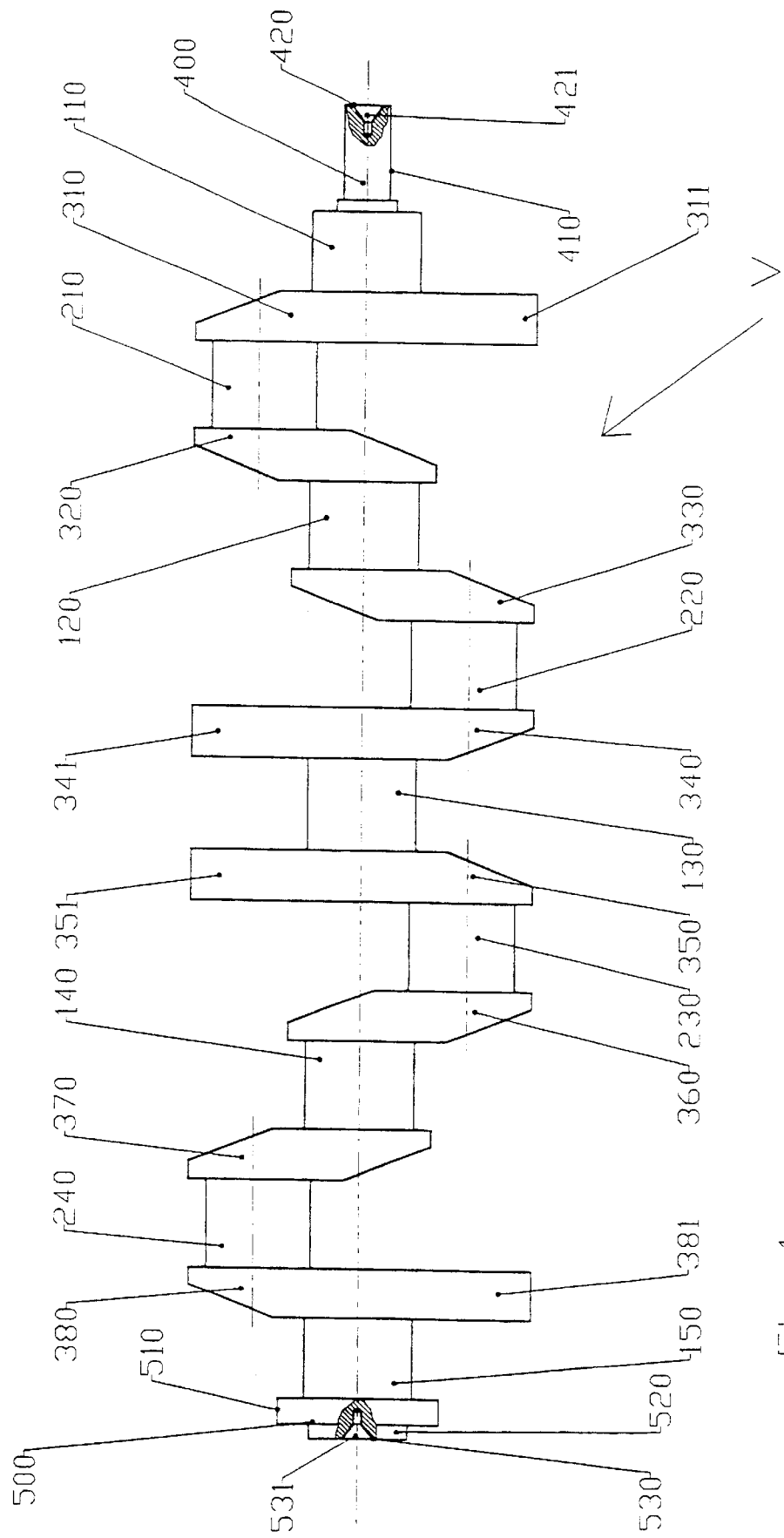
FIG. 1 is a side view of a standard crankshaft for an engine with four in-line cylinders.

As illustrated on the drawing of FIG. 1, a crankshaft for an engine with four in-line cylinders, referenced as V as a whole, comprises five bearings 110, 120, 130, 140, 150 used for the pivoting link with the crankcase of the engine (not illustrated). This crankshaft V also comprises four crankpins 210, 220, 230, 240 of which the axis is parallel with and shifted in relation to the rotation axis of crankshaft V so as to execute a link connecting rod/crank between crankshaft V and the four connecting rods (not illustrated) which comprise at one end a piston moving in a cylinder. These crankpins 210, 220, 230, 240 are situated between the bearings 110, 120, 130, 140, 150 and shifted from the axes by means of arms 310, 320, 330, 340, 350, 360, 370, 380 ensuring not only their shifting but also the spacing between the crankpins and the bearings. The two centre arms i.e. 340 and 350 as well as the two end arms i.e. 310 and 380 comprise a counterweight 341, 351, 311 and 381 used to balance the unbalance due to the shifting of the crankpins mass and the arms mass which are holding them.

The crankshaft V such as illustrated also comprises two ends 400 and 500 of which the first one is formed by a cylindrical surface 410 coaxial with the bearing 110 situated in its continuation but of lower diameter to the one finished on its end by a plane surface 420 perpendicular with the rotation axis of the crankshaft V. The second end 500 is in the continuation of the bearing 150 and is formed by a cylindrical surface 510 immediately placed against the bearing 150 coaxial with it but of higher diameter to which is placed against coaxial with another cylinder 520 of lower diameter finished by a plane surface 530 perpendicular to the rotation axis of crankshaft V.

Advantageously, the method for machining of the invention consists in pre-setting the reference surfaces by trimming the cylindrical surfaces 510 and 410 and the plane surfaces 420 and 530 of both ends 400 and 500 of the crankshaft V. Thus, before the balancing operation two perfectly cylindrical surfaces are defined which by defining a fictitious geometrical axis, are used as reference for the dynamic mass measurement operation.

This dynamic mass measurement operation brings into use two contact discs by cylindrical surface which drive in rotation by adherence the crankshaft V about an axis defined by the two cylindrical surfaces 410 and 510. The setting into rotation of the crankshaft V on a particularly well-defined geometrical axis enables to measure a particularly precise unbalancing.

This dynamic mass measurement on surfaces already machined enables to parameter the positioning of the ends of the crankshaft V during the following operation which consists of materialising precisely the principal inertia axis in drilling on the plane surfaces 420 and 530 of centering points 421 and 531, materialising a reference axis which will be used to position the crankshaft V in each machining station constituting the follow up of the production line of this crankshaft V.

Also, according to the invention, the method for machining the crankshaft V is remarkable in that it consists, after the dynamic mass and diameter measurement, of placing the crankshaft V in a device ensuring centering points drilling of points 421 and 531 on the plane reference surfaces 420 and 530 of the two pre-machined ends 400 and 500 of the crankshaft V so as to situate the unbalance zone in the counterweights of the said crankshaft V the centering points being used to put into place the said crankshaft V on each station of the machining line. Furthermore, according to another particularly advantageous characteristic of the invention, the positioning of the crankshaft V in the said drilling device is executed with numerised support points which come into contact with the said pre-machined cylindrical surfaces 410 and 510 while taking into account the dynamic mass and diameter measurement.

This last characteristic produces another advantage of the presence of machined reference surfaces in that the technology of numerised supports is much better exploited. In effect, apart from the fact that the dynamic measurement and diameter measurement parameters are much more precise due to the pre-machining of the raw crankshaft before dynamic measurement, the presence of regular cylindrical surfaces creates a zone of precise positioning for the said numerised supports present on the drilling device, which highly facilitates and improves the materialisation of the axis part by centering points drilling.

Thus, thanks to this precision in the materialisation of the principal inertia axis, it will be easy to give the best possible repetition of position in the transfer operations between the said different stations.

The breaking away from the classical conception of machining range of a crankshaft, realized by the present method, i.e. machining reference surfaces on a raw crankshaft before ensuring a first dynamic mass measurement and before centering points drilling, brings about a great deal of advantages and makes the precision of machining crankshafts evolve to a level never reached before by the classical machining ranges and procedures.

Figure 2A:
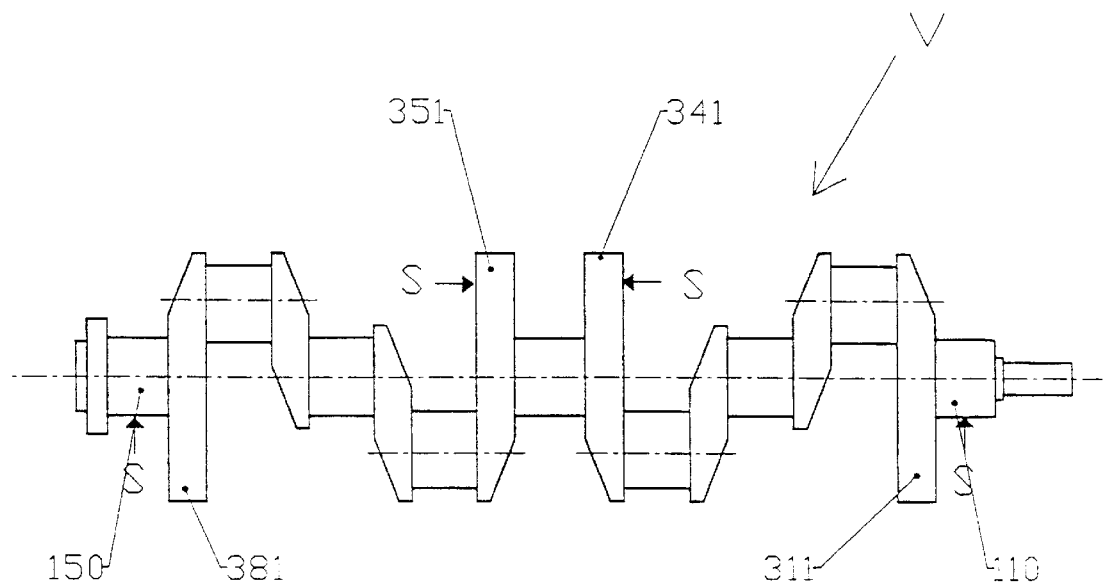
FIG. 2a is a side view of the crankshaft of FIG. 1 taking a first embodiment of gripping and putting the crankshaft into position.

FIG. 2a illustrates a preferred embodiment of gripping and putting the crankshaft into position during trimming. Advantageously, the gripping supports (materialised by the arrows S) of crankshaft V are executed on the first 110 and fifth 150 bearings and on the lateral surfaces of the two centre counterweights 341 and 351.

According to another particularly advantageous characteristic of the invention, the gripping operation (materialised by the arrow S) of crankshaft V is executed concentrically during the trimming operation.

Figure 2B:
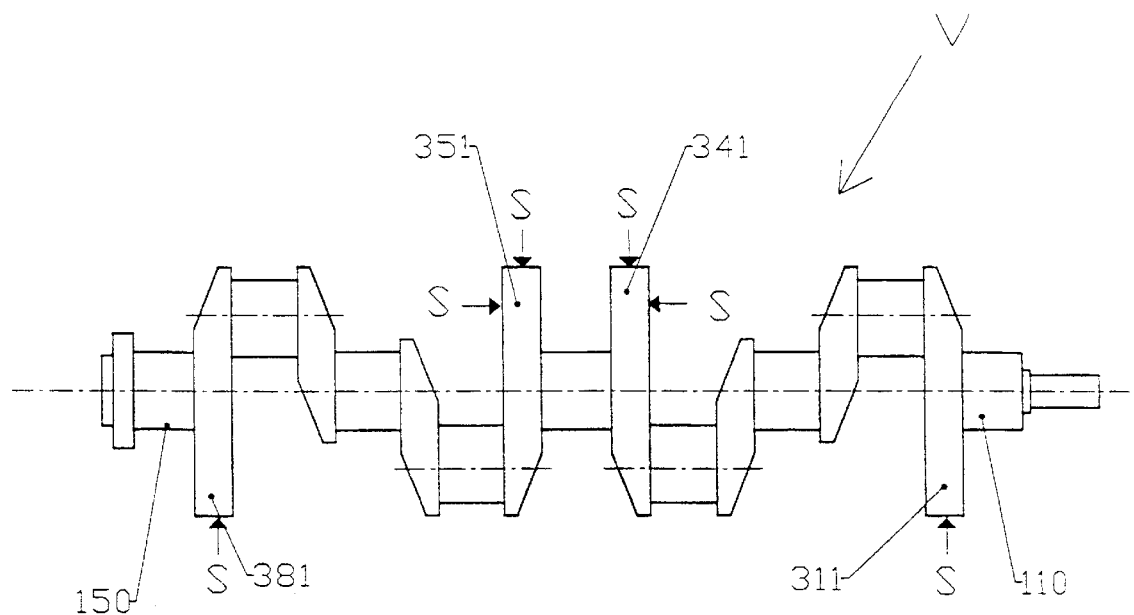
FIG. 2b is a side view of the crankshaft of FIG. 1 taking a second embodiment of gripping and putting the crankshaft into position.

FIG. 2b illustrates another preferred embodiment of gripping and putting the crankshaft into position, during the trimming operation.

Advantageously, the gripping supports (materialised by the arrows S) of crankshaft V are executed on the first 110 and fifth 150 bearings, on the lateral surfaces of the two centre counterweights 351 and 341 and on the cylindrical surfaces of the four counterweights 311, 341, 351 and 381, during the trimming operation defining the reference surfaces 510 and 410. Thus, when in the specifications required, the cylindrical surfaces of the counterweights stay raw, this sort of centering for the trimming operation enables to materialise the fictitious geometrical axis in relation with the cylindrical raw surface of the counterweights, which has for advantage to take into account the criteria of space needed for the passage of the counterweights inside the crankcase and notably during the rise of the piston. As for the first embodiment of gripping and putting the crankshaft into position, the gripping operation (materialised by the arrows S) is advantageously executed concentrically.

It is understood that the method for machining a crankshaft which has been described and represented hereinabove, is given for the purpose of disclosure and not limitation. It is obvious that various arrangements of, as well as modifications and improvements to, the example here above will be possible without departing from the scope of the invention taken in its broadest aspects and spirit.

What is claimed is:

1. Method for machining a crankshaft comprising steps of:
   dynamic mass measurement and drilling center points at a start of a machining line before the crankshaft is machined to a specified geometry; and
   pre-setting reference surfaces by machining of the crankshaft, before the step of dynamic mass measurement.

2. Method for machining a crankshaft according to claim 1, wherein said crankshaft has a first and a second end and, said step of pre-setting the reference surfaces is executed by machining both said first and second ends of the crankshaft before the step of dynamic mass measurement.

3. Method for machining a crankshaft according to claim 2, wherein said step of pre-setting the reference surfaces is executed by trimming cylindrical surfaces and plane surfaces of said first and second ends of the crankshaft.

4. Method for machining a crankshaft for an engine with four in-line cylinders according to claim 3, wherein the step of drilling center points is executed on first and fifth bearings and on lateral surfaces of two center counterweights, during the step of pre-setting the reference surfaces.

5. Method for machining a crankshaft for engine with four in-line cylinders according to claim 3, wherein the steps of drilling center points is executed on first and fifth bearings, on lateral surfaces of two center counterweights, and on cylindrical surfaces of four counterweights of the crankshaft, during the step of pre-setting the reference surfaces.

6. Method for machining a crankshaft according to claim 3, wherein said step of dynamic mass measurement comprises placing the crankshaft in a dynamic measurement device, after the step of pre-setting the reference surfaces, and further comprises rotating the crankshaft by driving the crankshaft via the aforesaid cylindrical surfaces.

7. Method for machining a crankshaft according to claim 6, wherein the aforesaid cylindrical surfaces are placed in contact with two driving discs having parallel rotation axes so that during a rotation movement of the discs, the crankshaft is driven in rotation to execute said step of dynamic mass measurement.

8. Method for machining a crankshaft according to claim 7, further comprising a step of diameter measurement of the cylindrical surfaces.

9. Method for machining a crankshaft according to claim 8, wherein said method comprises, after the steps of dynamic mass measurement and diameter measurement, said step of drilling center points, further comprising placing the crankshaft in a device configured for drilling center points on plane reference surfaces of the two pre-machined ends of the crankshaft so as to situate an unbalance zone in counterweights of the crankshaft the center points being used to put into place the said crankshaft on each station of the machining line, and wherein positioning of the crankshaft in the device for drilling is executed with numerised support points which come into contact with the pre-machined cylindrical surfaces while taking into account the dynamic mass measurement and the diameter measurement.

10. Method for machining a crankshaft according to claim 5, wherein gripping of the crankshaft is executed concentrically on the crankshaft during the step of pre-setting reference surfaces.

* * * * *